Patented Feb. 25, 1941

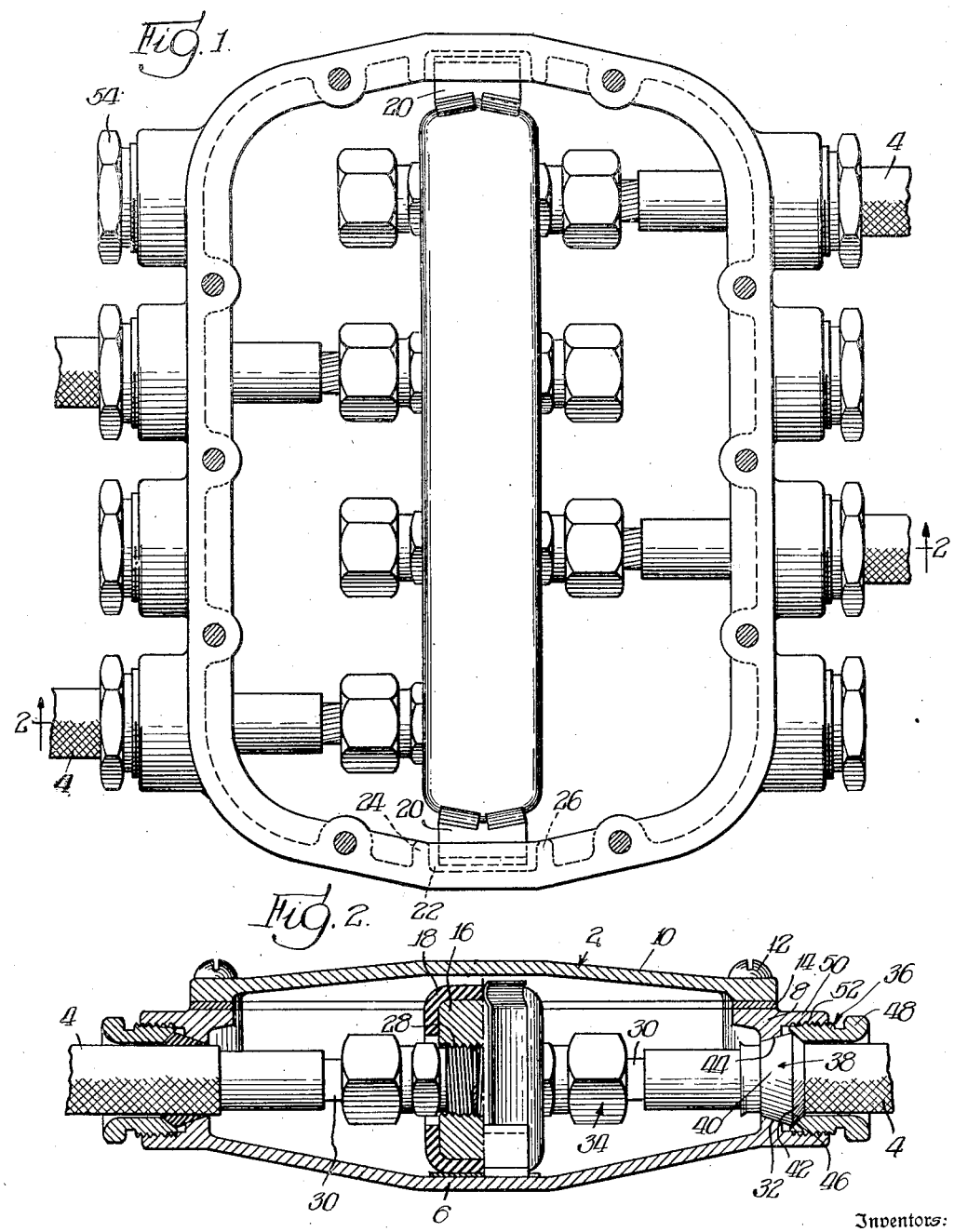

2,232,962

UNITED STATES PATENT OFFICE 2,232,962

ELECTRICAL CONNECTION

Andrew E. Papp, Chicago, Ill., and John L. Winks, deceased, late of Chicago, Ill., by Emily N. Winks, administratrix, Chicago, Ill., assignors to G & W Electric Specialty Co., Chicago, Ill., a corporation of Illinois Original application August 17, 1936, Serial No. 96,382. Divided and this application January 3, 1939, Serial No. 249,136

2 Claims. (Cl. 174—59)

The present invention relates to electrical devices, and more in particular to novel means for effecting a connection between cables in an underground system of electrical distribution, the same being a division of a copending application Serial No. 96,382, filed August 17, 1936, issued as Patent No. 2,195,630 on April 2, 1940.

Heretofore cables have been connected together or spliced by hand taping in the field. Such a joint is unsatisfactory from many standpoints, the principal objection being that the cables are not effectively connected together, the connections are not entirely moisture-proof and are rather cumbersome and difficult to effect in the field.

The present invention therefore has as an object the idea of providing simple and compact means for easily and readily connecting cables together, the same being waterproof throughout, and being readily accomplished in the field.

The present invention comprehends the idea of providing novel means of simple construction for effecting a connection between a plurality of cables in an underground system of distribution, such means being so constructed and arranged that the cables may be easily and readily connected or disconnected.

Another object of the present invention is to provide a novel means for connecting a plurality of cables together in an underground system of distribution wherein the connection between the cables is compact and completely enclosed to provide a water-tight joint between such cables.

Still another object of the present invention is to provide a novel connection between a plurality of cables, such connection including as an element a bus bar or connecting member enclosed by a covering of resilient or compressible insulating material. More specifically, the bus bar or connecting member is provided with a covering of rubber molded in situ over said bus bar or connecting member.

Another object within the purview of the present invention is to provide a novel connection between a plurality of cables and a bus bar wherein a housing in the form of a box is provided as a unitary structure to enclose the bus bar, the plurality of terminal ends of the cables and the connecting means between the same and the bus bar.

The present invention further comprehends the idea of providing a novel construction for effecting a connection between a plurality of cables in an underground system of distribution wherein the connection is provided within a housing and is formed in part by a bus bar or connecting member resiliently mounted in said housing whereby connections can be made to one or more cables without exact alignment of the various elements of the device.

Still another object is to provide a device as herein immediately above described, wherein the bus bar or connecting member is mounted upon insulating means to completely insulate the terminal connections of the cables from the housing.

More particularly, the present invention contemplates the idea of providing the immediately above described constructions wherein the bus bar or connecting member is provided with a covering of resilient or flexible insulating material which serves in part to provide a flexible and insulated mounting for the bus bar in the housing, and in part to completely insulate and cover the bus bar to facilitate handling and providing the connections to one or more cables.

Other objects, features, capabilities and advantages are comprehended by the invention, as will later appear and as are inherently possessed thereby.

Referring to the drawing:

Figure 1 is a fragmentary top plan view of a device for connecting a connection between a plurality of cables in an underground system of distribution; and Figure 2 is a view in cross-section taken in the plane represented by line 2—2 of Figure 1 of the drawing and disclosing the completed housing structure of the device.

Referring now more in detail to the drawing, an embodiment selected to illustrate the present invention is disclosed as comprising a device generally referred to as 2 which serves to connect together a plurality of cables, such as 4, in an underground system of distribution. The device 2 includes a housing formed in part by a box-like structure having a bottom wall 6 and a side wall 8, the box-like structure being closed by closure member 10 which is removably secured to the box-like structure as by means of a plurality of bolts 12, the gasket 14 being provided to insure a water-tight construction. This closure member 10 is readily removable whereby a connection between the cables 4 can be effected.

The connection between the cables 4 is accomplished by means of a connecting member or bus bar 16 disposed within the housing, said bus bar being preferably formed with a covering 18 of resilient insulating material. The bus bar 16 is mounted upon the lower wall 6 of the housing and may be held in place by means of the clip members 20 at each end thereof, which clip members in turn are disposed in the recesses 22 of the housing having the webs 24 and 26 preventing displacement of the clips.

As shown in the drawing, the bus bar 16 is provided with a plurality of cable attaching means 28 specifically shown as threaded openings which are adapted to threadedly engage with connector means disposed between the bus bar and the terminal end 30 of the cables. Inasmuch as all of the connections between the cables 4 and the bus bar are similarly made and the constructions involved are the same, reference will be made to the arrangement as shown in Figure 2 of the drawing as illustrating the same. Each of the cables 4 extends through an opening 32 provided in the side wall 8 of the housing, the cable being laid bare as at the terminal end 30 for reception by a connector means generally referred to as 34, and which may take the form of similar connector means shown in the parent application of which this is a division. This connector means grips the terminal end 30 of the cable, and in turn threadedly engages the attaching means 28 of the bus bar 16. In effecting this connection, a cable is directed through an opening 32 and into a position to be connected to the bus bar. The connector means 34 is then threaded to the bus bar 16 and manipulated to grip the terminal end of the cable.

In order to provide a water-tight construction, a gland assembly 36 is provided between the cable and the housing at the opening 32. This gland assembly comprises a bushing 38 embracing the cable 4 and being provided with the oppositely inclined surfaces 40 and 42, the surface 40 cooperating with a corresponding inclined surface 44 defining the opening 32 in the side wall, and the inclined surface 42 cooperating with a corresponding inclined surface 46 at the end of a gland nut 48 which also embraces the cable and threadedly engages the annular flange 50 of the housing as at 52 whereby the bushing 38 may be forced or wedged into intimate contact with the opening 32 to provide a water-tight joint, it being understood that this bushing is of some suitable resilient material, such as oil-resistant rubber or the like.

As clearly shown in the drawing, a connection has been made as by means of the bus bar between a plurality of cables extending into the housing from opposite sides. Such connections are alternately disposed with respect to one another in the device, and in such cases a plurality of separable closure members, such as 54, are provided to make the housing completely water-tight, said closure means being threaded into the projecting flanges 50 at those openings through which no cable extends. If it is desired, however, to effect a connection to the bus bar at any of these points, one or more of these removable closure members can be readily removed, a cable inserted through the opening, and a connection made to the bus bar through a connector means 34.

By providing a connection as disclosed in the drawing, certain very definite results are accomplished, namely, an efficient water-tight joint is provided at the connection for a plurality of cables in an underground system of distribution.

The covering 18 of resilient insulating material for the bus bar provides a flexible and resilient support for the bus bar on the bottom wall 6 whereby connections can be made to cable terminal ends with facility, it being understood that this flexible connection permits such connections even though various elements of the device are not in absolute alignment. This type of construction has a distinct advantage over the old porcelain type of connection wherein it was necessary to have absolute alignment to effect a connection for the terminal ends of the cables. This serious objection has been overcome because of the flexible or resilient mounting for the bus bar.

As a still further advantage of this arrangement, it should be noted that the covering 18 is of insulating material which completely insulates the bus bar from the housing. In other words, such a covering serves in part to provide an insulated mounting for the bus bar. As a still further advantage, the insulating covering 18 completely encloses the bus bar and facilitates positioning of the same as by means of the spring clips 20.

While we have herein described and upon the drawing shown an illustrative embodiment of the invention, it is to be understood that the invention is not limited thereto but may comprehend other constructions, arrangements of parts, details and features without departing from the spirit of the invention.

We claim:

1. In an electrical device, the combination of a housing having openings, one or more cables extending through said openings into said housing, a bus bar disposed in said housing and supported by the same, said bus bar having a resilient insulating covering to insulate said bar from said housing and to provide flexibility in the mounting of said bar within said housing, said bus bar having a plurality of cable attaching means substantially opposed to said openings, connector means removably connected to said attaching means and said one or more cables, and means comprising spring clips positioned by said housing and engaging the resilient covering at the ends of said bar for holding said bar in place within said housing and permitting adjustment of said bar with respect to said cables.

2. In an electrical device, the combination of a housing having openings, one or more cables extending through said openings into said housing, a bus bar disposed in said housing and supported by the same, said bus bar having a resilient insulating covering to insulate said bar from said housing and to provide flexibility in the mounting of said bar within said housing, said bus bar having a plurality of cable attaching means substantially opposed to said openings, connector means removably connected to said attaching means and said one or more cables, said housing having recesses oppositely disposed with respect to the ends of said bus bar, and means comprising spring clips engaging the resilient covering at the ends of said bar and having offsets received in said recesses for holding said bar in place within said housing and permitting adjustment of said bar with respect to said cables.

ANDREW E. PAPP.
EMILY N. WINKS,
*Administratrix of the Estate of John L. Winks, Deceased.*